Jan. 11, 1938.   C. L. MEINHOLDT   2,105,125
MOWER
Filed Jan. 4, 1936   4 Sheets-Sheet 2

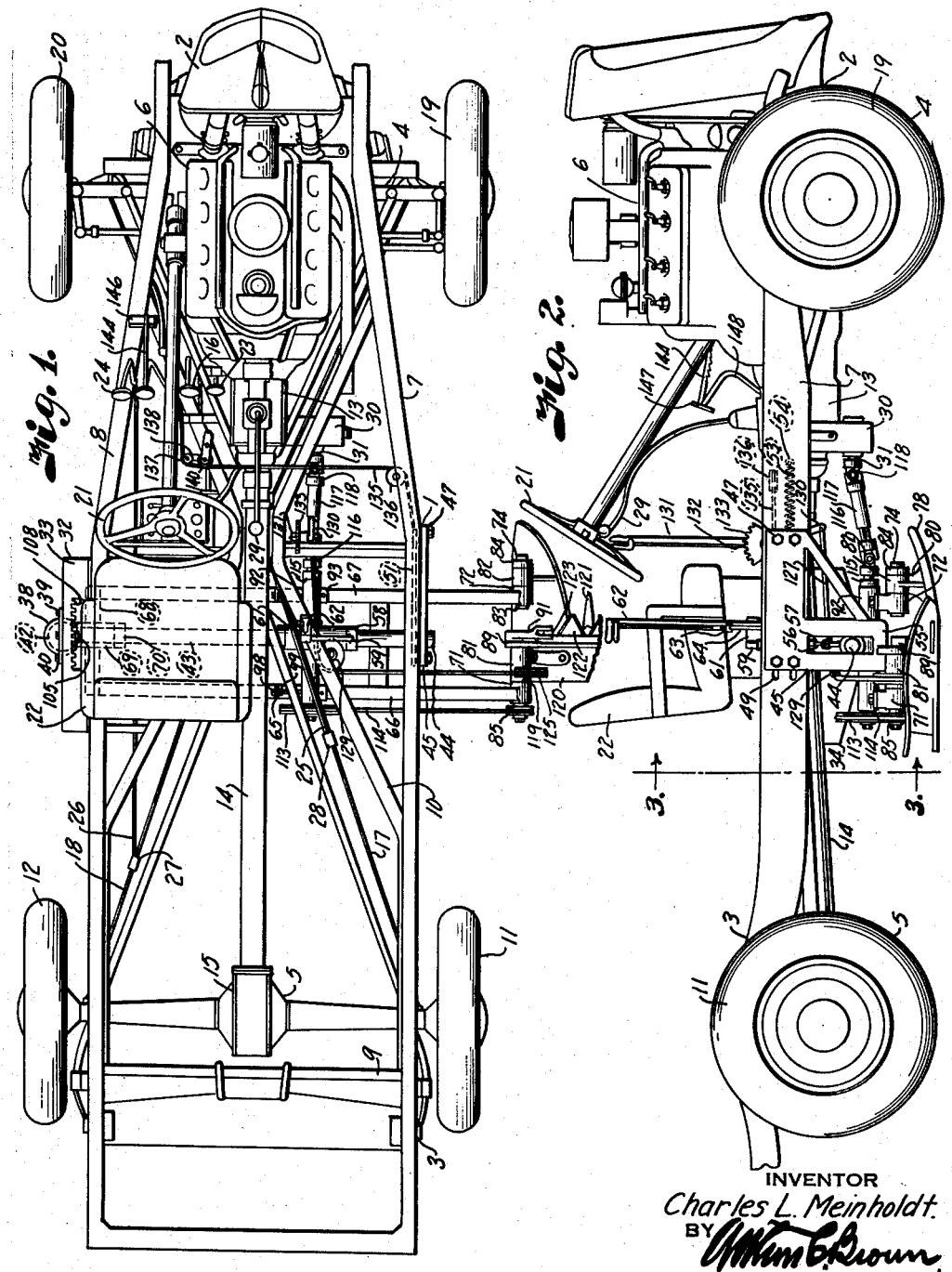

INVENTOR
Charles L. Meinholdt
BY
ATTORNEY

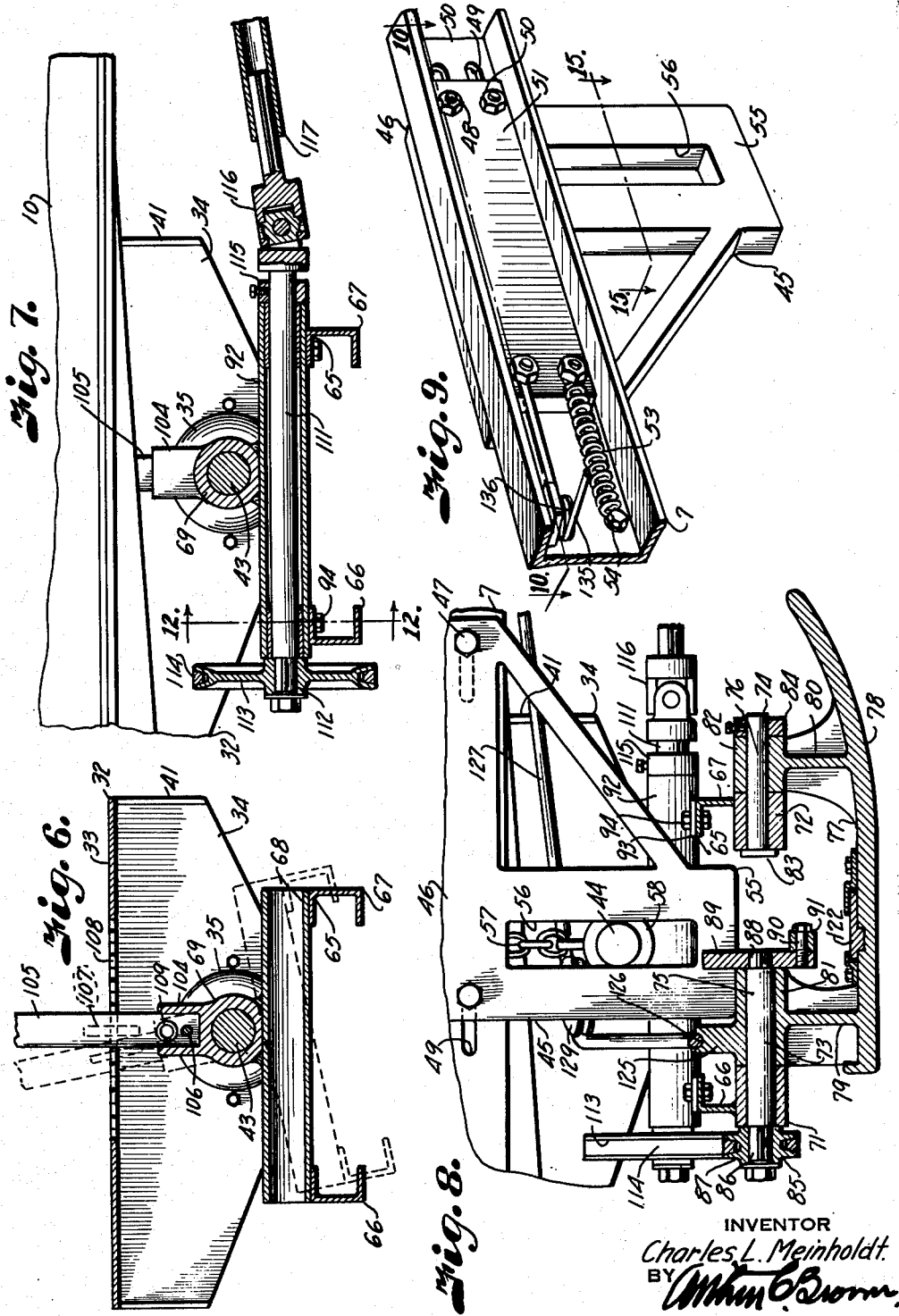

Jan. 11, 1938.  C. L. MEINHOLDT  2,105,125
MOWER
Filed Jan. 4, 1936  4 Sheets-Sheet 4
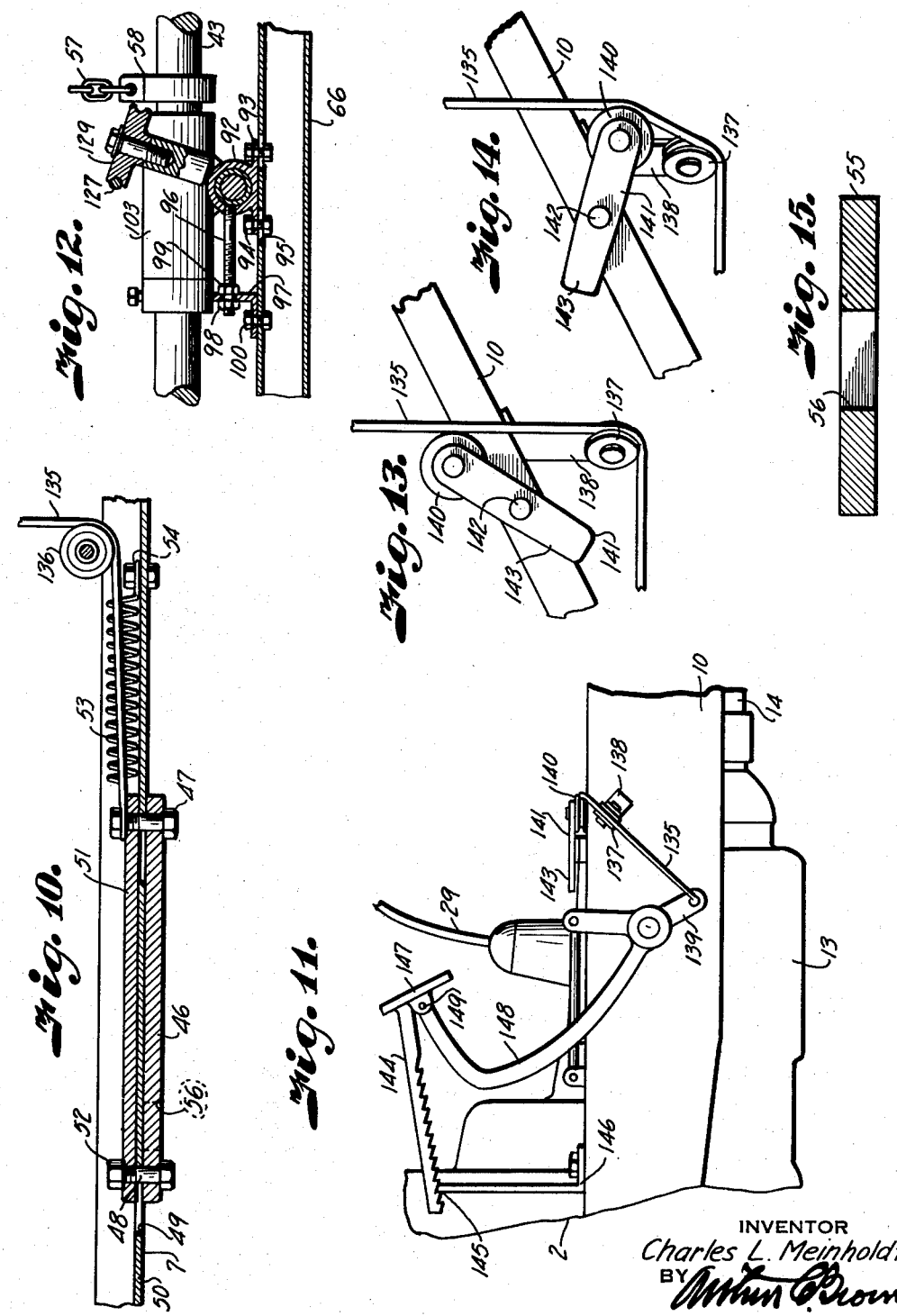
INVENTOR
Charles L. Meinholdt.
BY
ATTORNEY Patented Jan. 11, 1938

2,105,125

UNITED STATES PATENT OFFICE 2,105,125

MOWER

Charles L. Meinholdt, Topeka, Kans., assignor of one-fourth to Fred P. Martin and one-fourth to Charles H. Martin, both of Topeka, Kans.

Application January 4, 1936, Serial No. 57,576

13 Claims. (Cl. 56—25)

This invention relates to mowers, particularly to those of the power driven type, and has for its principal object to provide a mower adapted for use in cutting vegetation along the shoulders, drainage ditches and embankments of highways, railways, and other places inaccessible to ordinary power driven mowers.

Other important objects of the invention are to provide a mower with a sickle that can be operated in any lateral angle of inclination relatively to the machine; to provide a mower capable of fast and close work; to provide safety means for stopping the mower in case the sickle should strike an obstruction; to provide flexibility of construction, thereby eliminating binding of the operating mechanism and torsional strains on the supporting structure; to provide a mower structure having substantial ground clearance and yet capable of producing a close cut; and to provide a sickle operating mechanism wherein the same relative positions of the sickle bar and guard are maintained throughout the entire angular range of the sickle.

It is also an important object of the invention to prevent loss of traction in case one of the wheels encounters a soft or wet place in the ground over which the mower is operated.

A further object of the invention is to provide a sickle and drive unit which is adapted for attachment to an ordinary motor vehicle chassis.

In accomplishing these and other objects of the invention, I have provided improved details of structure, the preferred form of which is illustrated in the accompanying drawings, wherein:

Fig. 1 is a plan view of a mower embodying the features of the present invention.

Fig. 2 is a side elevational view of the mower.

Fig. 3 is an enlarged vertical cross section through the mower on the line 3—3 of Fig. 2, showing the sickle in horizontal position.

Fig. 4 is a similar view showing the sickle extending at an upward angle relative to the machine, and showing its maximum upper position in dotted lines.

Fig. 5 is an enlarged detail perspective view of the universal suspension of the subframe on the main frame of the mower.

Fig. 6 is a detail section on the line 6—6 of Fig. 5, illustrating rocking movement of the subframe for tilting the sickle.

Fig. 7 is a detail section through the subframe on the line 7—7 of Fig. 4, particularly illustrating mounting of the countershaft.

Fig. 8 is a detail section through the shoe portion of the sickle, particularly illustrating mounting of the crank in the pivotal axis of the sickle.

Fig. 9 is a detail perspective view of a portion of the main frame illustrating mounting of the bracket which guidingly retains the sickle side of the subframe.

Fig. 10 is a section on the line 10—10 of Fig. 9.

Fig. 11 is a detail elevational view of the clutch control lever and cable mechanism for releasing the clutch incidental to the sickle striking an obstruction.

Fig. 12 is a section on the line 12—12, Fig. 7, illustrating the adjustable mounting of the countershaft on the subframe for tensioning the drive belt operating the crank shaft of the sickle.

Fig. 13 is a detail plan view of the guide and release pulleys of the clutch tripping cable.

Fig. 14 is a similar view showing the release pulley in position for tensioning the trip cable.

Fig. 15 is a section through the guide bracket on the line 15—15 of Fig. 9.

Referring more in detail to the drawings:

1 designates a mower constructed in accordance with the present invention and which includes a substantially conventional automotive chassis 2 comprising a main frame 3, front and rear axle units 4—5, and a power unit 6. The frame 3 includes longitudinal side members 7 and 8 connected by suitable cross members 9 and a substantially X-shaped centrally positioned bracing member 10. The rear axle unit includes traction wheels 11 and 12 that are operated from the power unit 6 through a conventional transmission consisting of a change speed gearing 13, a driving shaft 14, and a differential mechanism 15, as in conventional automotive vehicle construction. The traction wheels 11 and 12 are equipped with the usual brakes actuated from a foot pedal 16 through cables or rods 17 and 18. The front axle unit includes wheels 19 and 20 that are steered through a suitable linkage with a steering wheel 21 located adjacent the operator's seat 22, the operator's seat being carried on the side frame 8 and cross member 10 at a point substantially midway between the front and rear axle units so that it is located directly over the sickle operating mechanism, later described.

The brakes for the wheels 11 and 12 may be selectively and individually operated from foot pedals 23 and 24, independently of the foot pedal 16, through cables 25 and 26 that are respectively connected with the cables or rods 17 and 18 by means of clamps 27 and 28. Thus when the foot pedal 24 is operated, the brake is applied to the wheel 12 and when the foot pedal 23 is operated the brake is applied to the wheel 11. This is an important feature of the present invention since the mower must be operated in drainage ditches and other places where one of the drive wheels is likely to lose traction, in which case the brake is applied to that wheel so that all of the power is diverted through the differential mechanism 15 to the other wheel, thereby permitting the machine to be operated in places where it could not be moved with the conventional differential drive and brake mechanisms.

The transmission gearing 13 is operated by a conventional gear shift lever 29, also located adjacent the operator's seat. The gearing 13 also includes a power take-off 30 connected therewith and having a power take-off shaft 31 to which the driving mechanism of the mower is connected as later described.

Fixed on the side member 8 of the chassis frame, at a point substantially midway between the axle units, is a bracket 32 (Fig. 3) having a laterally extending portion 33 terminating in a depending arm 34 having an annular flange 35 (Fig. 5) surrounding an opening 36 and forming a spherical socket 37. The socket 37 cooperates with a substantially hemispherical cap member 38 that is fixed to the arm 34 by means of bolts 39 extending through the arm and through an annular flange 40 of the cap 38, as best illustrated in Fig. 5.

The arm 34 may be suitably braced from the lateral portion 33 of the bracket by web or gusset plates 41. Located within the substantially spherical socket formed by the members 35 and 38 is a ball end 42 of a subframe supporting member 43 that projects through the opening 36. The member 43 is of circular cross section and extends transversely across the width of the chassis frame so that its free end 44 may be guidingly mounted in a bracket 45 which depends from the side frame member 7. The guide bracket 45 is best illustrated in Figs. 2 and 9, and includes a plate portion 46 overlying the outer side of the frame member 7 and carries bolts 47 with their shanks 48 extending through slotted openings 49 in the web 50 of the chassis frame member 7.

Cooperating with the plate portion 46 and engaging the opposite side of the web 50, is a plate 51 through which the shanks of the bolts 47 are projected to mount nuts 52 for clampingly retaining the plates in sliding engagement with the web 50. The plate 51 and the plate portion 46 of the bracket are yieldingly retained with the bolts 47 located in the forward ends of the slots 49 by means of a coil spring 53 having one end fixed to one of the bolts 47 and its opposite end anchored to the web 50, as indicated at 54. The bracket 45 is thus mounted for limited longitudinal movement on the chassis frame against action of the spring 53 in a rearward direction for a purpose later described.

The bracket 45 has a depending arm 55 aligning with the depending arm of the bracket 32, and is provided with a vertical guide slot 56 to pass the free end 44 of the subframe supporting member 43. The shaft is thus supported for swinging movement in a vertical plane, but is retained against horizontal movement independently of the bracket.

The free end of the shaft member 43 is adjustably suspended from the main frame by means of a flexible connection 57 that is fixed at one end to a collar 58 mounted on the shaft and its opposite end is fixed to an arm 59 (Fig. 3) that is carried on a rock shaft 60 pivotally supported in a bracket 61 on the X member. The rock shaft 60 is operated to raise and lower the arm 59 by means of a lever 62 that is located adjacent the driver's seat, and which carries a pawl 63 engageable with a fixed rack segment 64 to retain the shaft in set position.

The mower mechanism is carried by a subframe 65 including spaced transverse channels 66 and 67 connected adjacent the ball end of the shaft 43 by a transverse tubular member 68 which is welded to the upper flanges of the channels 66 and 67, and carries a sleeve 69 welded thereto and extending transversely thereof to engage over the shaft member 43. The sleeve 69 is retained against longitudinal movement on the shaft by means of a stop collar 70 engaging the end thereof, as best shown in Fig. 4. The free ends of the members 66 and 67 extend beyond the bracket 45 and carry transversely positioned bearings 71 and 72 respectively mounting a crank shaft 73 (Fig. 8) and an aligning pivot pin 74. The shaft 73 and pin 74 have forwardly projecting ends 75 and 76 to mount a sickle shoe 77.

The sickle shoe 77 includes a runner 78 having upwardly extending brackets 79 and 80 carrying bearing sleeves 81 and 82 for pivotal bearing support on the projecting ends 75 and 76, as best shown in Fig. 8. The pin 74 includes a head 83 engaging against the end of the bearing 72 and has a retaining collar 84 at its opposite end engaging against the bearing 82.

The crank shaft 73 is retained in the bearing sleeves 71 and 81 by means of a groove pulley 85 (Fig. 8) keyed to a reduced end 86 of the shaft and which has its hub portion 87 bearing against the end face of the bearing 71. The opposite end of the crank shaft has a reduced end 88 to which is splined a crank member including a disk 89. The disk 89 carries a wrist pin 90 to which is connected one end of a pitman 91 for operating a sickle bar, later described.

Adjustably mounted on the ends of the channel members 66 and 67 of the subframe, in substantial alignment with the power take-off shaft 31, is a transverse sleeve 92 (Fig. 12) having flanges 93 which are fixed to the upper flanges of the channel members by fastening devices 94 extending through slots 95 therein. The sleeve 92 is moved along the subframe relatively to the pivotal axis of the shoe by means of draw screws 96 having one of their ends connected with the sleeve while their opposite ends are extended through openings in angle clips 97 and adjustably retained by jamb nuts 98 and 99 engaging the respective sides of the angle clips. The angle clips are rigidly retained on the channel members by fastening devices such as bolts 100. It is thus obvious that when the nuts 98 and 99 are adjusted the sleeve 92 is caused to move along the subframe to and from the crank shaft.

Fixed to the sleeve 92, substantially midway the ends thereof, is a transversely extending sleeve 103 having pivotal bearing on the shaft member 43 to pivotally support the outer end of the subframe. The subframe is thus mounted for swinging movement on the shaft member 43 to vary the inclination of the sickle shoe relative to the ground.

In order to rock the frame on the shaft, the bearing sleeve 69 carries an upwardly extending socket 104 in which is mounted a lever 105, the level being slidingly retained on a pin 106 extending across the socket and through a suitable opening in the lower end of the lever as shown in Fig. 6.

The lever 105 carries a lug 107 that is normally retained in engagement with a fixed toothed rack 108 by means of a coil spring 109 mounted in the socket and engaging against the face of the lever. The lever extends upwardly from the socket to adjacent the driver's seat and terminates in a handle portion 110. When the lever is drawn toward the driver's seat the lug 107 is released from engagement with the rack 108 to permit rocking movement of the subframe. Upon release of the lever, the spring 109 effects return of the lug 107 into engagement with the rack teeth to retain the subframe in the desired tilted position.

Rotatably mounted within the sleeve 92 is a countershaft 111 (Fig. 7) having a projecting end 112 on which is fixed a grooved pulley 113 aligning with the grooved pulley 85. Operating within the grooves of the respective pulleys is a belt 114 whereby the crank shaft is driven from the countershaft. The opposite end of the countershaft projects from the end of the sleeve and carries a retaining collar 115 to cooperate with the pulley 113 in preventing longitudinal movement of the shaft within the sleeve. Fixed to this end of the shaft is a flexible coupling 116 that is connected by means of a telescoping shaft 117 with the power take-off shaft 31 through a second universal joint 118 to compensate for the various tilting positions of the subshaft relative to the power take-off.

The sickle is designated 119 (Fig. 1) and includes a sickle guard 120 having teeth 121 wherein a sickle 122 is reciprocably mounted as in conventional sickle construction. The inner end of the sickle carries a ball bracket 123 to which is connected the socket end 124 of the pitman 91 previously mentioned. Owing to the fact that the sickle is mounted for swinging movement in a vertical plane about the axis of the crank shaft, the ball bracket always retains its same relative spacing therefrom and consequently the blades of the sickle bar always retain their same relative position to the teeth 121 of the guard, regardless of the inclination angle of the sickle. With the construction illustrated, the sickle may operate successfully at any angle through a range of substantially 180° from a perpendicular position above the crank shaft to substantially a perpendicular position below the crank shaft, thereby permitting operation of the machine along the sides of banks or drainage ditches so that the sickle may cut the vegetation growing thereon.

In order to raise the sickle bar to the desired cutting angle, the bearing sleeve 81 carries a pulley segment 125 having a groove 126 in which lies an operating cable 127 that is fixed to an arm 128 of the segment, and has its opposite end extending over a pulley 129 rotatably mounted on the bearing sleeve 103 to connect with the depending end 130 of a rock lever 131. The lever 131 is pivotally mounted on a convenient cross member of the chassis frame and includes a pawl 132 for engaging a fixed rack segment 133, the pawl being operated at the upper end of the lever as in the case of the lever 62.

In operating the machine along highways, the sickle is liable to strike some hidden obstruction and in order to prevent damage to the machine I provide mechanism for automatically throwing out the clutch which connects the power unit with the transmission gearing, and which is operated by a pedal lever 148, as now described. Connected with one of the bolts 47 at the end of the plate 51 adjacent the spring 53 is a cable 135 (Fig. 1) operating over a guide pulley 136 on the side frame and over a guide pulley 137 carried by a bracket 138 that is fixed to the X frame of the chassis. The opposite end of the cable connects with a depending arm 139 of the clutch pedal lever and is guided over a pulley 140 also fixed to the frame, as best illustrated in Fig. 11.

The cable 135 is of sufficient length that the clutch pedal can be operated by the foot of the operator to disengage the clutch without interference, however when the machine is in operation the cable is tensioned by means of a control lever 141 which is pivotally mounted on the X frame and carries the groove pulley 140 engageable with the cable, as best shown in Fig. 14. The lever is pivoted on a pin 142 and has an end 143 projecting into convenient reach of the foot of the operator. When the lever is swung into the position shown in Fig. 13 there is sufficient slack in the cable to permit free operation of the clutch pedal, however when it is in the position shown in Fig. 14 the slack is taken up and any movement of the plate 51 and bracket 55 in a rearward direction is imparted to the clutch lever through the cable to effect disengagement of the clutch, for example when the sickle strikes an obstruction.

Upon engaging an obstruction the sickle tends to swing backwardly, swinging the subframe horizontally by reason of its ball and socket connection with the chassis frame. This movement of the subframe causes rearward movement of the bracket 55 which draws on the cable to release the clutch and stop forward travel of the machine.

When the clutch is operated by the sickle it is retained in disengaged position by means of a notched arm 144 engageable with a detent 145 formed as a part of a fixed bracket 146. The notched arm is rigidly attached to a foot pedal 147 which in turn is pivotally connected with the free end of the lever 148, as indicated at 149. Thus when the operator's foot engages the lower portion of the pedal it raises the notched arm from engagement with the tooth of the bracket, thereby releasing tension on the cable 135 and allowing the spring 53 to return the subframe to normal position.

In operating a machine constructed and assembled as described, and assuming that the engine is operating, the clutch pedal 144 is released from latching engagement with the tooth 145 to allow engagement of the clutch and movement of the machine along the ground. The sickle is also being simultaneously operated through the flexible connection of the power take-off shaft 31 with the countershaft 111 which in turn drives the crank shaft through the belt connection 114. Rotation of the crank effects reciprocation of the sickle bar through the pitman connection 91. The sickle is then lowered into cutting position by adjusting the hand levers 62 and 131.

Upon adjusting the hand lever 62, the sickle side of the subframe is raised and lowered to position the sickle as to height, and manipulation of the lever 131 adjusts the angular elevation of the sickle relatively to the machine. When the lever 131 is rocked on its pivotal support the cable 127 plays over the pulley 132 and segment 125 to swing the sickle about the axis of the crank shaft. This movement of the sickle in no way affects the relation of the teeth of the sickle bar to the guards since the stroke of the sickle bar always remains the same regardless of the angular position thereof relative to the axis of the crank shaft. The subframe may be tilted on the supporting member 43 to adjust the forward tilt of the sickle by manipulating the lever 105.

Should the sickle strike an obstruction, the sickle bar, including the subframe, will swing rearwardly on its universal connection to effect rearward movement of the bracket 55 against action of the spring 53. This movement of the bracket draws on the cable 135 to effect disengagement of the clutch and latching of the clutch lever 148 to stop forward movement of the machine. The operator may then raise the sickle so that it will clear the obstruction. The lever 143 upon being swung into the position shown in Fig. 13 relieves tension on the cable 135 so that the spring 53 can return the subframe and sickle to its normal position relative to the chassis frame. The clutch is then reengaged by pressing the foot against the lower portion of the pedal 147 to raise the notched arm 144 from engagement with the tooth 145. The machine is now continuing its forward travel and the sickle bar may be lowered to its original cutting position.

As the machine is moved along, the sickle bar is readily adjusted to the contour of the ground over which the sickle bar passes by manipulating the levers 62, 131 and 110. With the sickle properly adjusted it can be made to closely follow the ground contour and leave a uniform stubble. Should one of the traction wheels encounter a soft place in the ground and lose its traction, the brake for that wheel may be applied to divert power to the other wheel through the differential mechanism to continue forward movement of the machine.

From the foregoing it is obvious that I have provided a mower construction which is particularly adapted for cutting vegetation along the shoulders of drainage ditches and other irregular places along highways that are ordinarily inaccessible to power driven mowers.

It is also obvious that due to my improved mounting of the subframe relative to the main chassis frame the machine is very flexible and there is little likelihood of any torsional strains that may be applied to the chassis interfering with the smooth operation of the sickle mechanism.

What I claim and desire to secure by Letters Patent is:

1. In a mower, a wheel supported frame, a subframe, means pivotally and swingingly mounting the subframe on the wheel supported frame, means for yieldingly retaining the subframe from swinging movement on the wheel supported frame, a sickle, means for pivotally mounting the sickle on the subframe, means for actuating the sickle including means for propelling the wheeled frame, and means for rendering said actuating means ineffective responsive to swinging movement of the subframe.

2. In a mower, a wheel supported frame, a subframe, a sickle carried by the subframe, means universally supporting the subframe on the wheeled frame for vertical and horizontal swinging movement relatively to said wheeled frame, a motor for propelling the wheeled frame, driving means connecting the motor with the sickle including a clutch, means for disengaging said clutch incidental to horizontal swinging movement of the subframe, and means for normally retaining the subframe from said swinging movement.

3. A mower including a wheeled frame, a socket member carried at one side of the wheeled frame, a supporting member having a ball at one end mounted in said socket member, a bracket mounted at the opposite side of the frame for guidingly supporting the opposite end of the supporting member, a subframe mounted on said supporting member, means carried by the wheeled frame and connected with the supporting member for raising and lowering the subframe, a sickle carried by the subframe, and means for actuating the sickle.

4. A mower including a wheeled frame, a socket member carried at one side of the wheeled frame, a supporting member having a ball at one end mounted in said socket member, a bracket mounted at the opposite side of the frame for guidingly supporting the opposite end of the supporting member, a subframe mounted on said supporting member, means carried by the wheeled frame and connected with the supporting member for raising and lowering the subframe, a sickle actuating means on the subframe, a sickle, and means supporting the sickle on the subframe.

5. A mower including a wheeled frame, a socket member carried at one side of the wheeled frame, a supporting member having a ball at one end mounted in said socket member, a bracket mounted at the opposite side of the frame for guidingly supporting the opposite end of the supporting member, a subframe mounted on said supporting member, means carried by the wheeled frame and connected with the supporting member for raising and lowering the subframe, a sickle actuating means on the subframe, a sickle, and means supporting the sickle on the subframe for pivotal movement about the axis of the sickle actuating means.

6. A mower including a wheeled frame, a socket member carried at one side of the wheeled frame, a supporting member having a ball at one end mounted in said socket member, a bracket mounted at the opposite side of the frame for guidingly supporting the opposite end of the supporting member, a subframe mounted on said supporting member, means carried by the wheeled frame and connected with the supporting member for raising and lowering the subframe, a sickle actuating means on the subframe, a sickle, means supporting the sickle on the subframe for pivotal movement about the axis of the sickle actuating means, a motor on the wheeled frame, and a flexible driving means connecting the motor with the sickle actuating means.

7. In a mower, a wheel supported frame, a subframe, a sickle carried by the subframe, means universally supporting the subframe on the wheeled frame for vertical and horizontal swinging movement relatively to said wheeled frame, a motor for propelling the wheeled frame, a driving means connecting the motor with the sickle including a clutch, means for disengaging said clutch incidental to horizontal swinging movement of the subframe, means for yieldingly retaining the subframe from said swinging movement, and means for retaining the clutch in disengaged position.

8. A mower including a wheeled frame, a socket member carried at one side of the wheeled frame, a supporting member having a ball at one end mounted in said socket member, a bracket slidably mounted at the opposite side of the frame for guidingly supporting the opposite end of the supporting member, a subframe mounted on said supporting member, means carried by the wheeled frame and connected with the supporting member for raising and lowering the subframe, a sickle actuating means on the subframe, a sickle, means supporting the sickle on the subframe for pivotal movement about the axis of the sickle actuating means, a motor on the wheeled frame, driving means including a clutch for connecting the motor in driving relation with the wheeled frame, flexible driving means connecting the motor with the sickle actuating means, means for yieldingly resisting movement of the bracket, and means connected with the bracket for disengaging said clutch.

9. In combination with a motor propelled chassis, a mower attachment including a frame, means for pivotally universally mounting one side of the frame to one side of the chassis, means for guidingly suspending the opposite side of the frame from the other side of the chassis, a sickle pivotally connected with the guided side of said frame, and driving means for the sickle located in the axis of said sickle connection.

10. In combination with a motor propelled chassis, a mower attachment including a frame, means for pivotally universally mounting one side of the frame to one side of the chassis, means for guidingly suspending the opposite side of the frame from the other side of the chassis, a sickle pivotally connected with the guided side of said frame, driving means for the sickle located in the axis of said sickle connection, means connecting the sickle with the motor, and means for disconnecting the motor from driving relation with the chassis incidental to swinging movement of said frame in a horizontal direction.

11. In a mower, a wheel supported frame, a subframe, means universally mounting the subframe on the wheel supported frame, a sickle, means for actuating the sickle, means mounting the sickle on the subframe for pivotal movement about the axis of said actuating means, means for tilting said sickle, and means for holding said sickle in cutting position.

12. A mower including a wheeled frame, a socket member carried at one side of the wheeled frame, a supporting member having a ball at one end mounted in said socket member, a bracket mounted at the opposite side of the frame for guidingly supporting the opposite end of the supporting member, a subframe mounted on said supporting member, means carried by the wheeled frame and connected with the supporting member for raising and lowering the subframe, a sickle carried by the subframe, means for actuating the sickle, and means for tilting said sickle.

13. A mower including a wheeled frame, a socket member carried at one side of the wheeled frame, a supporting member having a ball at one end mounted in said socket member, a bracket slidably mounted at the opposite side of the frame for guidingly supporting the opposite end of the supporting member, a subframe mounted on said supporting member, means carried by the wheeled frame and connected with the supporting member for raising and lowering the subframe, a sickle actuating means on the subframe, a sickle, means supporting the sickle on the subframe for pivotal movement about the axis of the sickle actuating means, means for tilting said sickle, a motor in the wheeled frame, driving means including a clutch for connecting the motor in driving relation with the wheeled frame, flexible driving means connecting the motor with the sickle actuating means, means for yieldingly resisting movement of the bracket, and means connected with the bracket for disengaging said clutch.

CHARLES L. MEINHOLDT.